(12) United States Patent
Greub et al.

(10) Patent No.: US 6,491,444 B1
(45) Date of Patent: Dec. 10, 2002

(54) METHOD FOR FIXING AN OPTICAL FIBER CABLE IN A CONNECTOR FOR A CONNECTABLE OPTICAL FIBER CONNECTION AND ADHESIVE USE IN SAID METHOD

(75) Inventors: Daniel Greub, St. Gallen (CH); Beat Koch, Waldkirch (CH); Kurt Stephan, Herisau (CH); Urs Fankhauser, Wilen bei Wil (CH)

(73) Assignee: Huber & Suhner AG, Herisau (CH)

( * ) Notice: Subject to any disclaimer, the term of this patent is extended or adjusted under 35 U.S.C. 154(b) by 0 days.

(21) Appl. No.: 09/462,922

(22) PCT Filed: Jul. 16, 1998

(86) PCT No.: PCT/CH98/00311

§ 371 (c)(1),
(2), (4) Date: Jun. 22, 2000

(87) PCT Pub. No.: WO99/04299

PCT Pub. Date: Jan. 28, 1999

(30) Foreign Application Priority Data

Jul. 17, 1997 (CH) .............................................. 1757/97

(51) Int. Cl.⁷ ................................................ G02B 6/38
(52) U.S. Cl. ..................................................... 385/80
(58) Field of Search .......................... 385/80, 140, 147, 385/84, 94

(56) References Cited

U.S. PATENT DOCUMENTS

| | | | |
|---|---|---|---|
| 4,446,257 A | 5/1984 | Kooijmans et al. | 523/403 |
| 4,790,622 A | 12/1988 | Levinson et al. | 385/80 |
| 5,790,762 A | 8/1998 | Aepli et al. | 385/80 |

FOREIGN PATENT DOCUMENTS

| | | |
|---|---|---|
| DE | 3429626 A | 2/1986 |
| DE | 19528351 | 2/1996 |
| DE | 19512427 | 10/1996 |
| EP | 0227002 | 7/1987 |
| EP | 0273415 | 7/1988 |
| EP | 0434212 | 6/1991 |

*Primary Examiner*—Tulsidas Patel
(74) *Attorney, Agent, or Firm*—Tarolli, Sundheim, Covell, Tummino & Szabo L.L.P.

(57) ABSTRACT

A method fixes an optical fiber (15) in a connector (10) for an optical plug-in connection. The connector (10) includes a location body (11) having a bore hole (12) to receive the optical fiber (15). In accordance with the method, the optical fiber (15) is inserted into the bore hole (12) of the location body (11) and is fixed therein by bonding with an adhesive (19). Easy and stable bonding is achieved by using a solid chemically reactive adhesive (19) which is reacted when brought into a liquid state and which enables a temperature-resistant connection.

21 Claims, 6 Drawing Sheets

METHOD FOR FIXING AN OPTICAL FIBER CABLE IN A CONNECTOR FOR A CONNECTABLE OPTICAL FIBER CONNECTION AND ADHESIVE USE IN SAID METHOD

DESCRIPTION

1. Technical Field

The present invention relates to the area of light wave guide technology. It relates to a procedure for attaching a light wave guide in a connector for an optical plug-in connection according to the introductory clause of claim 1.

Such a procedure is known from publication U.S. Pat. No. 4,790,622, for example.

The application also relates to an adhesive for use in such a procedure.

2. Prior Art

Two-component epoxy adhesives are generally used to bond optical light wave guides, in particular light wave guide cables, with corresponding connectors. Depending on the type of manufacture, use is made of adhesives of this kind with a long "pot life". To achieve a reasonable cycle time under these preconditions while manufacturing the adhesive bond, post-curing with the application of heat must take place. However, it is also conceivable to use two-component adhesives with a short pot life, which reach the desired strength at room temperature within 10–20 minutes. However these two-component adhesives must be prepared several times a day, i.e., mixed together out of several separately prepared components.

In addition to these epoxy adhesives, recent times have seen the development of acrylate-based adhesives, and their increasing use in "on site" packaging, meaning outside the manufacturing facility, i.e., at the assembly site. These acrylate adhesives are easier to handle. Even though they also consist of two components, they offer the advantage of very short reaction times. However, the storage stability of the products is very limited at temperatures exceeding 40° C. Since temperatures of up to 60° C. are easily reached in the unit load under the tarpaulin during transport by truck in the summer after 2 hours of exposure to direct sunlight, the application of such highly reactive adhesive systems is clearly limited.

For example, another patent of the applicant (CH-A5687621) describes bonding a light wave guide into the ferrule of an optical plug-in connection by means of an adhesive consisting of two components. One of the two components, which each consist of unsaturated compounds dissolved in mono- and/or multifunctional acrylates, is accommodated in the bore hole of the ferrule for this purpose. The light wave guide is wetted with the other component before introduced into the bore hole. During insertion, a boundary layer reaction gives rise to polymerization within a few minutes. The prefilled ferrules require special facilities, however. In addition, the component in the ferrule might in some circumstances become unusable under unfavorable storage conditions, as a result of which the ferule itself, which is the most valuable component of the plug-in connector due to the highly precise ceramics used, becomes unusable.

Also known are connectors/plugs that are filled with a hot-melt-type adhesive. These connectors are heated on site in a heater, and the light wave guide is introduced in a hot state. Work can then continue after cooling. The disadvantage to this adhesive system is that the adhesive, which is solid in a cold state, softens again at elevated temperatures, and cannot be used everywhere given this limited temperature resistance.

A similar solution, in which a solid, multi-component reaction adhesive is used instead of a melt adhesive, in which the adhesive is liquefied via heating, thereby initiating a hardening reaction, is known from the U.S. Pat. No. 4,790,622 mentioned at the outset. The disadvantage here is that the connector as a whole becomes no longer useable once the reaction adhesive therein has exceeded its shelf life or has been degraded by external factors.

A composite adhesive for optical and optoelectronic applications is described in DE-A1-195 12 427. The adhesive is present as a liquid dispersion, and is therefore less suitable for outside use.

Another solution that does completely without adhesives would be mechanical fixation, in which mechanical means are used to laterally press on the fibers lying in the connector. Since a high lateral pressure would be necessary to immovably fix the fibers, the fibers could deform after a longer period of time. Such a deformation would result in the diminished performance or complete failure of the light guide.

DESCRIPTION OF THE INVENTION

Therefore, the object of the invention is to indicate a procedure for attaching a light wave guide in a connector that avoids the disadvantages of known procedures, and in particular can be performed easily and simply at the assembly site, and that is distinguished by a very good storability and low temperature sensitivity on the part of the means used.

The object is achieved via the totality of features in claim 1.

The use of a solid reaction adhesive as described in the invention, which only reacts when transformed into a liquid state (melted or dissolved), and then goes over into a thermoset state, eliminates the mixing of the adhesive, and makes the completely hardened (cured) adhesive compound comparatively insensitive to later temperature increases. However, it is particularly advantageous that the solid reaction adhesive can be stored especially well and long prior to its use without loosing its adhesive power. The powdery adhesive has the special property of being free-flowing and very easily moveable, as long as the adhesive is fully functional, but that it is baked or sintered together into a solid mass once it has lost its adhesive power. The use of a powdery adhesive also has the particular advantage that simply shaking the adhesive container makes it possible to determine whether the adhesive is still usable, which is not possible for other adhesive systems.

A first preferred embodiment of the procedure described in the invention is characterized by the fact that the receptacle is brought to and maintained at a temperature greater than or equal to the melting point of the adhesive, and that the light wave guide is introduced into the bore hole of the heated receptacle with the adhering particles. The special advantage to this is that no other additional chemical agents must be prepared for performing the bonding process. Rather, the adhesive reaction is initiated through a simple (controlled) temperature increase.

The adhesion of the powdery adhesive to the light wave guide, which can probably be attributed to electrostatic forces of attraction or surface forces, surprisingly causes precisely the correctly metered amount of adhesive (a few mg) to be transferred into the bore hole, and hence to the bonding location. This automatically and easily avoids disrupting excess amounts of adhesive at the bonding location.

Another preferred embodiment of the procedure according to the invention is characterized by the fact that the adhesive is transformed into the liquid state by adding a solvent, that the light wave guide is first immersed into the solvent with its one end, and that the light wave guide is subsequently immersed in the powdery adhesive with its one end. The solvent dissolves the reactive components in the reaction adhesive, causes them to start reacting with each other. A special metering of the solvent is here not necessary. While the solvent must be kept additionally available and applied in this case, a heater need not be used.

One particularly good and stable bond arises when using a receptacle with a bore hole whose inside diameter is only slightly, preferably 0.002 to 0.008 mm, larger than the outside diameter of the light wave guide according to another preferred embodiment of the procedure described in the invention. If the adhesive is transformed into the liquid state through heating, the adhering powdery adhesive is stripped from the light wave guide during insertion of the light wave guide into the bore hole due to the slight diameter tolerances, comes into contact with the heated receptacle, melts open, and is then drawn into the gap between the light wave guide and receptacle as a (relatively low-viscosity) liquid, to subsequently be hardened. At the same time, the light wave guide is effectively guided into the bore hole before hardening. In this case, excessive stripped particles of adhesive can accumulate in the funnel-shaped opening of the borehole without the danger of falling off, and form a melt bath enveloping the light wave guide, from which enough liquid adhesive can always be drawn into the gap when introducing the light wave guide into the bore hole.

The adhesive according to the invention intended for use in the procedure described in the invention is characterized by the fact that the adhesive is a two-component reaction adhesive, and that the adhesive essentially consists of a solid, preferably a crystalline, resin, to which is added a solid aid for curing purposes.

One preferred embodiment of the adhesive is characterized by the fact that the solid resin is selected from among the group of unsaturated polyester resins, the solid acrylate resins, the methacrylate solid resins and epoxy solid resins, and that a peroxide, e.g., an amine adduct for the epoxy resins, is used as the curing aid for the polyester, acrylate and methacrylate resins.

One preferred further development of this embodiment is characterized by the fact that a (1.1-di(tert.butylperoxide) 3.3.5-trimethylcyclohexane 40% on chalk) is used as the peroxide, that the adhesive is present in powder form, that a separating agent is added to the powdery adhesive, preferably in the form of a colloidal silica, and that a pigment, preferably a red iron oxide, is mixed in with the powdery adhesive, for better monitoring the bonding process. The separating agent receives the free-flowing properties, and prevents a reaction between the components before melting takes place. The pigment makes it possible to easily track the melting and reaction process visually.

In a first further development, a polyester resin based on terephthalic acid is used as the unsaturated polymer resin, and the adhesive is composed of 89% polyester resin, 6% 1.1-di(tert.butylperoxide) 3,3,5-trimethylchclohexane 40% on chalk, 3.5% colloidal silica and approx. 1.5% iron oxide.

In a second alternative further development, the solid resin is a mixture of methacrylamide and bisphenol A-dimethacrylate, and the adhesive consists of 80% methacrylate, approx. 9% bisphenol A-dimethacrylate, approx. 6% 1.1-di(tert.butylperoxide) 3.3.5-trimethylcyclohexane 40% on chalk, approx. 1.5% iron oxide.

In a third alternative further development, the solid resin is an epoxy resin, and the adhesive consists of 50–70% epoxy resin, 20–40% epoxy adduct, 5–10% colloidal silica and approx. 1.5% iron oxide.

Additional embodiments are derived from the subordinate claims.

BRIEF EXPLANATION OF FIGURES

The invention will be explained in further detail below based on embodiments in conjunction with the drawing. Shown on.

WAYS FOR IMPLEMENTING THE INVENTION

FIGS. 1a–e show various preparatory steps during the manufacture of an adhesive bond between a light wave guide and a connector according to a first preferred embodiment of the procedure described in the invention, in which the adhesive is transformed into a liquid reactive state by heating. As shown in FIG. 1a, the process tarts with a cylindrical receptacle (a ferrule) 11 of a connector 10, which normally is made out precision ceramics, and exhibits a concentric bore hole 12, whose end forms a funnel-shaped opening 13. The high-precision bore hole 12 is shown with an exaggerated inside diameter in the figures to better visualize the bonding procedure. The procedure according to the invention is used to bond a light wave guide 14 into the receptacle 11, said wave guide normally being provided with a protective cover 16 and forming the central part of an optical cable 14 (FIG. 1b).

To prepare the bond, the cover 16 is first distanced from the light wave guide by a predetermined distance of the optical cable 14 as shown in FIG. 1c, so that the light wave guide lies bare over this length. The length over which the light wave guide 15 is laid bare measures 5 cm, for example. The uncovered light wave guide 15 is subsequently cleaned to ensure a clean adhesive surface. This is preferably done mechanically using a nap-free fleece, which is used to rub off the surface of the light wave guide. The optical cable 14 prepared in this way is then immersed according to 1d with the uncovered and cleaned light wave guide 15 into a container 17 with a powdery adhesive 18, and then withdrawn again. Electrostatic charging or adhesive forces cause individual particles 19 of the adhesive to remain behind on the surface of the light wave guide while withdrawing the light wave guide 15 from the adhesive 18 (FIG. 1e), thereby forming an adhesive supply of a few (approx. 2–5) mg, which is transported over along with the light wave guide 15 to the receptacle, and can there be used to bond both parts. The powdery adhesive 18 is a solid reaction adhesive, which melts open at a melting point lying clearly above room temperature, and is cured to a temperature-resistant (thermoset) bond in a melted state. So that melting and the accompanying reaction can proceed, the receptacle 11 according to FIG. 2 is placed in a heater 22. In the example shown, the heater 22 consists simply of a unit made out of a material with good thermal conductivity, which exhibits a bore hole for holding the receptacle 11, and is heated via heating means (not shown), i.e., through electrical resistance heating, via a flame or the like, can be monitored while being heated to a specific, preset temperature. However, it is also conceivable to use a device that can operate in a contactless manner with thermal radiation instead of a heatable unit.

As soon as the heater 22 has reached the preset temperature (determinable via a temperature sensor or the like), the light wave guide 15 with the adhering adhesive particles 19 is slowly introduced into the bore hole 12 of the heated receptacle 11 through the funnel-shaped opening 13. The adhesive particles 19 are successively stripped during the immersion of the light wave guide 15 into the bore hole, contact the hot wall of the funnel-shaped opening, melt and form a melt bath 20 comprised of melted adhesive in the funnel. This melting process can easily be visually monitored by the user by mixing dye pigments in with the adhesive, which impart a uniform (e.g., red) color to the liquefied adhesive.

The light wave guide 15 passes through the continuously self-refilling melt bath 20 and into the bore hole 12, during which liquid adhesive gets into the annular gap 21 between the light wave guide 15 and inner wall of the bore hole 12 due to the light wave guide 15 as well as capillary forces, and fills it as far as the light wave guide 15 extends into the bore hole 12. The annular gap 21 (adhesive gap) usually has a gap width of 0.001 to 0.004 mm (the diameter difference between the light wave guide 15 and bore hole 12 is double that). The melted adhesive 18 must therefore exhibit a sufficiently low viscosity at the treatment temperature (up to 150° C.) to reliably fill up the annular gap 21. Therefore, an adhesive 18 exhibiting a viscosity of less than or equal to 500 mPa.s in the melted (not yet cured) state is preferably used.

The process of curing (hardening) the melted reaction adhesive is preferably set up in such a way as to have a short reaction time, preferably between 10 and 20 seconds, in particular about 15 seconds. This time is entirely sufficient to completely insert the light wave guide 15 into the bore hole 12 of the receptacle 11 while melting the adhering adhesive particles 19, so that it's short end peeks out on the other side of the bore hole 12 (see FIG. 3). The rapid curing prevents an inadvertent withdrawal of the light wave guide 15, and enables an immediate further treatment of the bonded parts. For example, only a few minutes after the light wave guide 15 has been introduced, the receptacle 11 can be removed from the heater 22, and the end of the light wave guide 15 projecting out on the other side can be separated off, so as to create the fiber end surface necessary for the subsequent smooth operation of the optical connector, so that the fiber is centered in the bore hole, and is not drawn through the bore hole wall by the capillary effect, since the adhesive remains only stays in the liquid phase a short time. The thermal conduction in the fibers melts the adhering adhesive 19 even on the light wave guide 15 located outside the bore hole, and can thereby replace the previously removed coating (cover 16), so that the light wave guide 15 is not left unprotected in front of the funnel-shaped opening.

Figure 1:
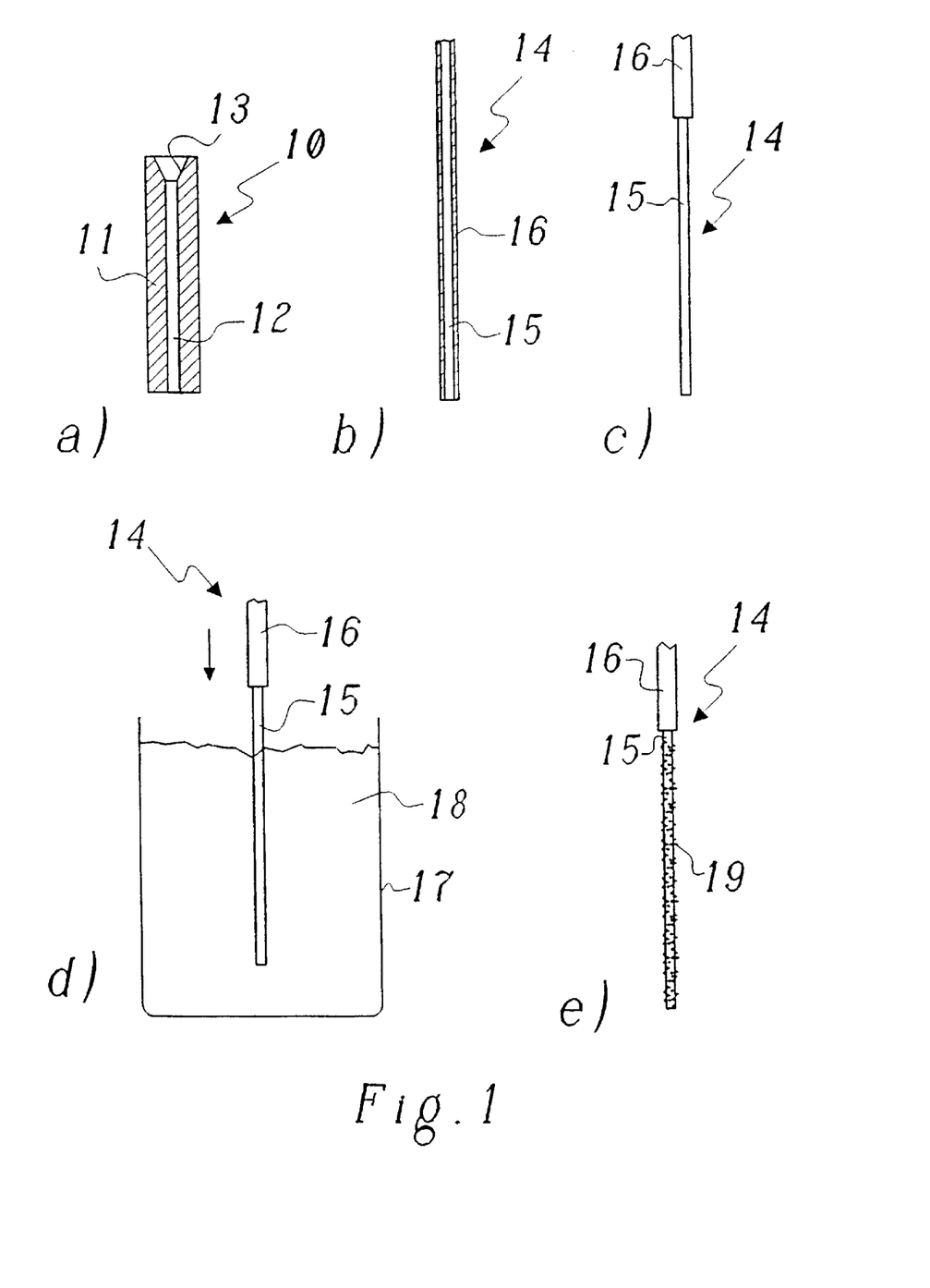
FIGS. 1a–e are various preparatory steps during the manufacture of an adhesive bond between the light wave guide and a connector according to a first preferred embodiment of the invention.
Figure 2:
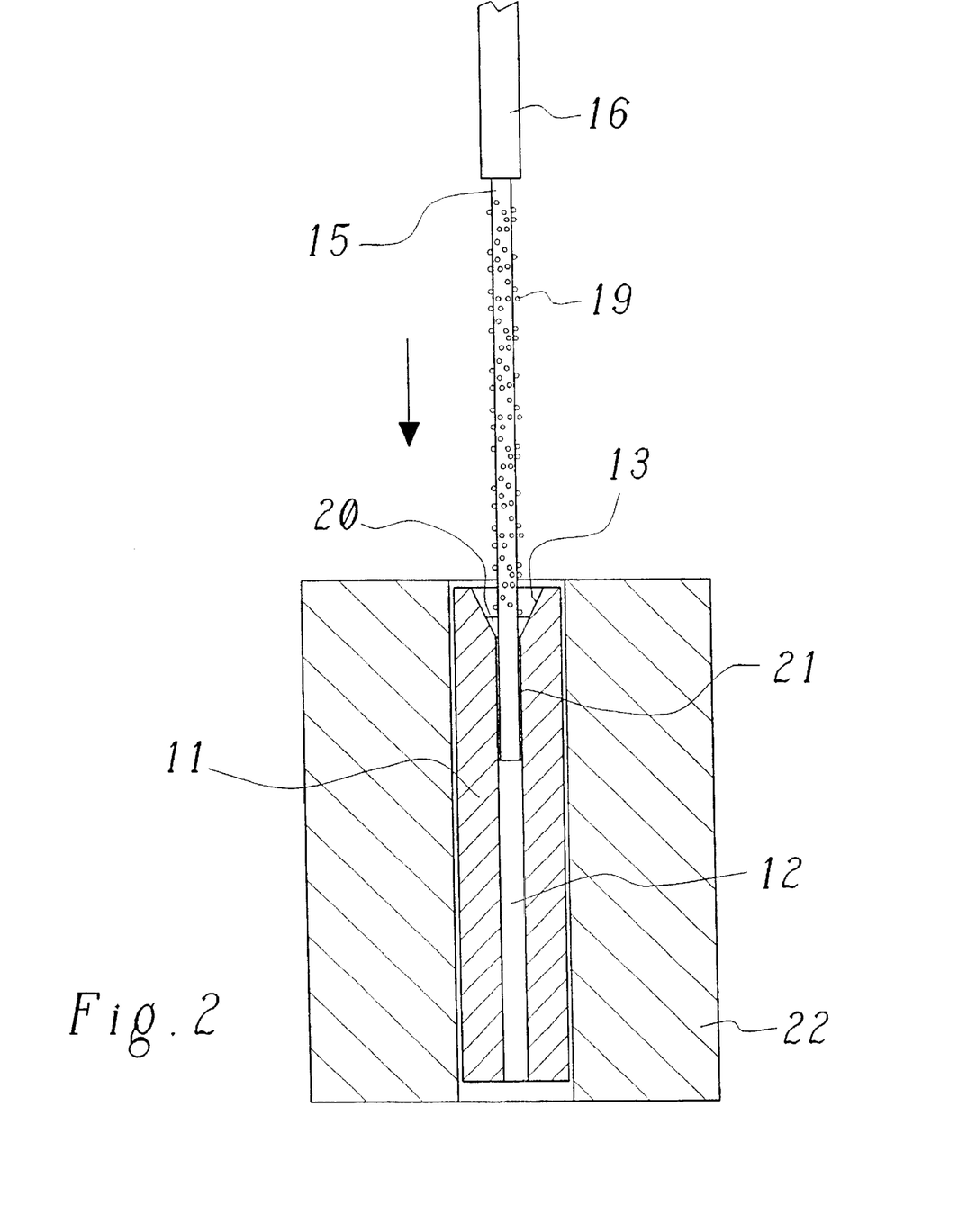
FIG. 2 is a magnified view from FIG. 1 showing the introduction of the light wave guide covered with the powdery adhesive into the bore hole of the preheated receptacle (FIG. 1e)
Figure 3:
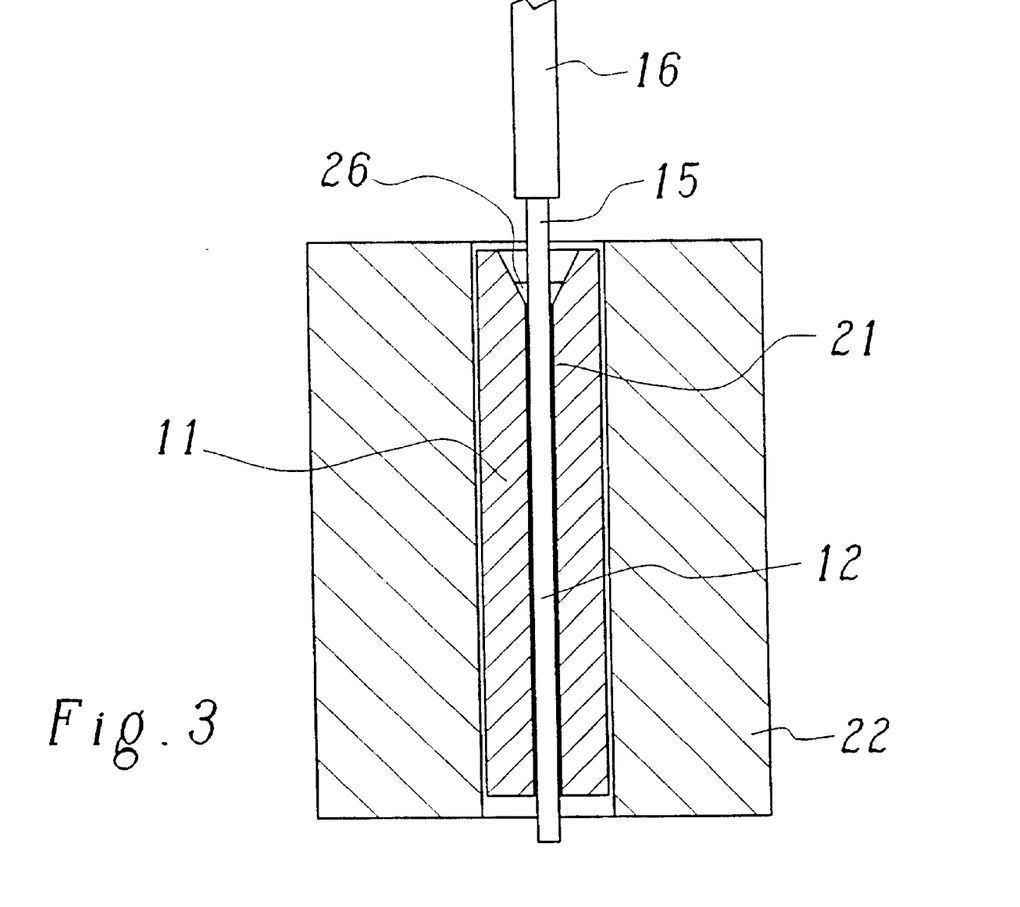
FIG. 3 is the final state of the adhesive bond achieved after the complete insertion of the light wave guide according to FIG. 2, FIGS. 4a–d are the preparatory steps comparable to FIGS. 1a–e for a bonding procedure according to a second preferred embodiment of the invention.

Instead of the procedure depicted in FIGS. 1 to 3, in which the adhesive particles 19 are introduced into the heated receptacle 11 adhering to the light wave guide, a procedure can also be selected within the framework of the invention that is shown in FIGS. 4a–d, 5 and 6. In this case, use is made of the same receptacle 11 (FIG. 4a), which in this case is inserted in a cap-shaped mount 23 with the end that exhibits the funnel-shaped opening 13. The mount 23 envelops the funnel-shaped opening 13 with a bore hole 24, through which the uncovered light wave guide 15 (FIGS. 4b, c) of the optical cable 14 can be introduced into the bore hole 12 of the receptacle 11. The funnel-shaped opening 13 is now (FIG. 4) filled with a sufficient quantity of particles 19 of the powdery reaction adhesive. The bore hole 24 here makes it possible to fill up the opening over the top edge. The adhesive can be filled in directly at the assembly site, or within the framework of a prepackaging at the plant. In the latter case, it makes sense to seal the filled opening with a protective membrane, so that the adhesive cannot fall out during a later transport.

Figure 5:
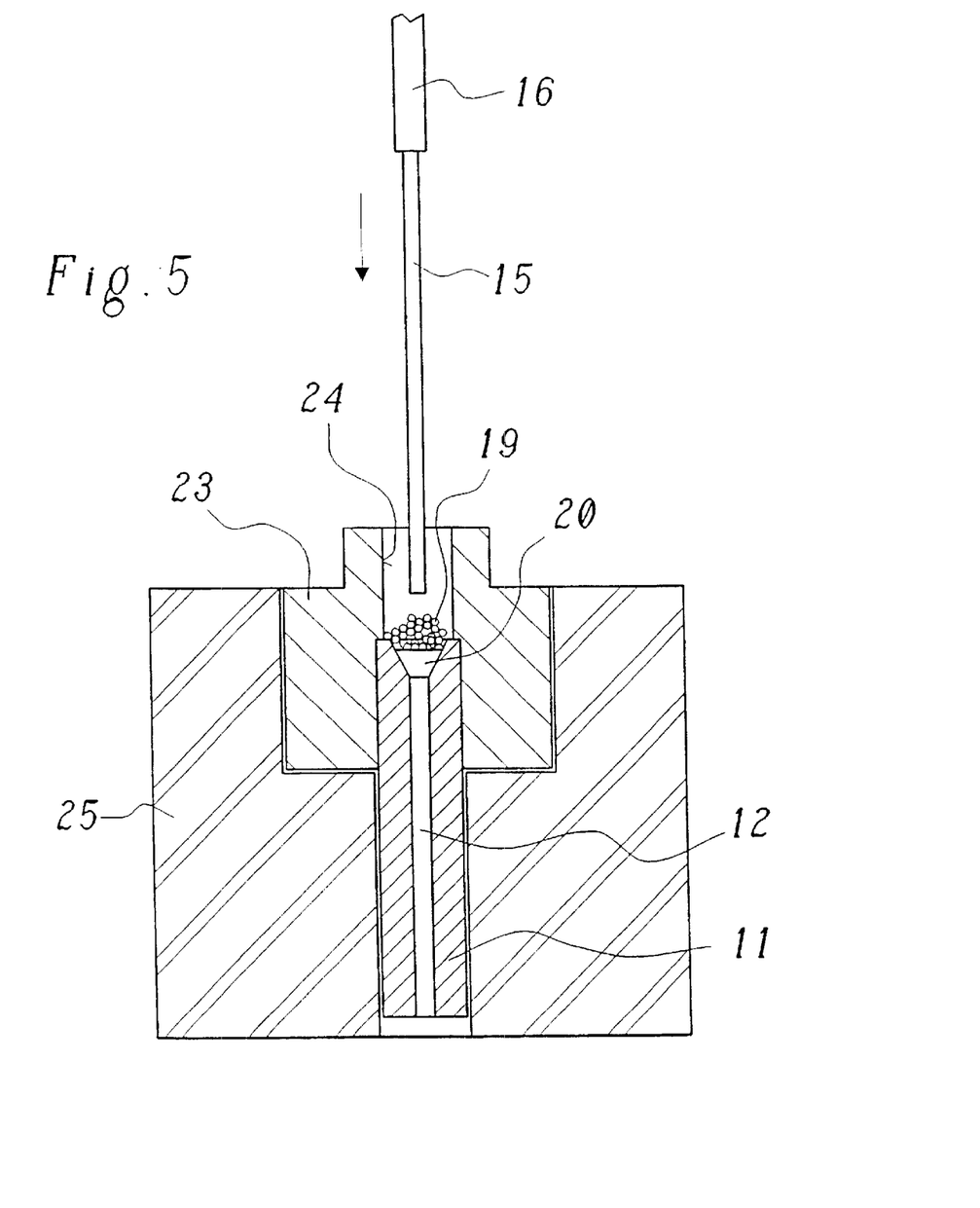
FIG. 5 is the procedure comparable to FIG. 2 for the introduction per the preparatory steps described in FIGS. 4a–d.
Figure 6:
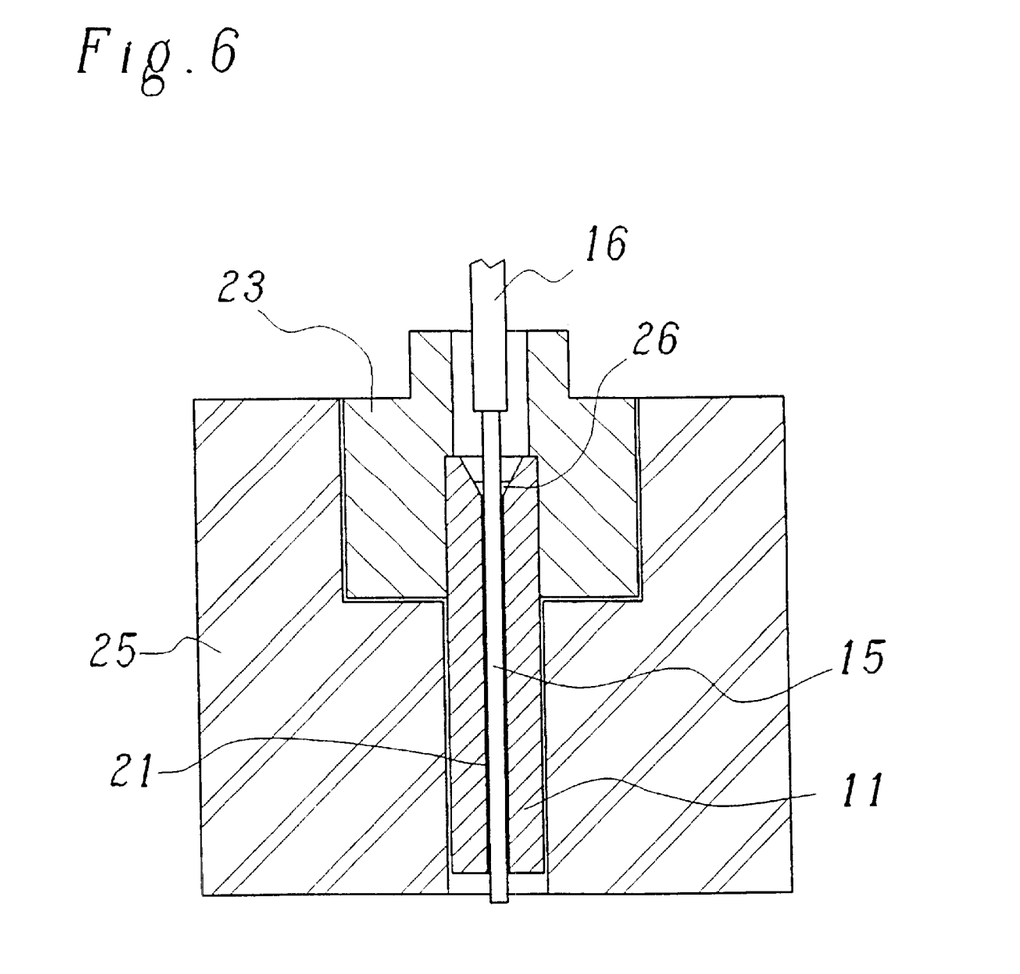
FIG. 6 is the final state comparable to FIG. 3 of the adhesive bond after insertion according to FIG. 5.

The receptacle 11 prepared in this way can then be placed in a correspondingly designed heater 24 according to FIG. 5, and heated to the melting point of the adhesive. As soon as a melt bath 20 comprised of melted adhesive as formed in the lower area of the funnel-shaped opening 13, as visible from the pigments added to the adhesive, the (cleaned) light wave guide 15 is continuously introduced into the bore hole 12 of the receptacle 11, and thereby brings with it the liquid adhesive into the annular gap 21 between the bore hole 11 and light wave guide 15, as already described above, where it is cured and brings about the bond (FIG. 6). After several minutes, the receptacle 11 with the light wave guide 15 can be removed from the heater 25, and the projecting end of the light wave guide 15 can be optically treated (ground).

The procedure according to the invention places comparatively high demands on the used adhesive. These requirements can be summarized in the following requirements profile:

| Material to be bonded: | Ceramic glass |
| --- | --- |
| Reaction time: | 10–15 s |
| Viscosity during treatment: | Max. 500 mPa.s |
| Strength: | > Breaking strength LWG |
| Final strength: | After 20 s |
| Adhesive gap: | 0.001–0.004 mm |
| Ageing behavior: | After 500 h at room temperature (RT) Tensile stress 5 N without damping change |
| Storage stability: | Min. 5 h at 70° C.; > 2 years at RT |
| Storage temperature: | −25 ° C. to +70° C. |
| Treatment temperature: | Max. 150° C. |
| Application temperature after treatment | −10° C. to +85° C. |
| Application amount: | 2–10° C. to +85° C. |

To satisfy this requirements profile, the adhesive 18 used for the procedure is a two-component reaction adhesive that essentially consists of a solid, preferably a crystalline resin, and to which a solid aid is added for curing purposes. The solid resin is here preferably selected from the group of unsaturated polyester resins, the solid acrylate resins, the methacrylate solid resins and epoxy solid resins. A peroxide is selected as the curing aid for the polyester, acrylate and methacrylate resins, while an amine adduct is used for the epoxy resins. In particular, a (1.1-di(tert.butylperoxide) 3.3.5-trimethylcyclohexane 40% on chalk) is used as the peroxide. The adhesive is present in powder form. A separating agent is mixed in with the powdery adhesive, preferably in the form of a colloidal silica. For better monitoring the bonding process, a pigment, preferably a red iron oxide, is mixed in with the powdery adhesive. The powder form of the mixture is achieved by milling the solid resin with the colloidal silica and the pigment for 24 h to 48 h in a ball mill, and the material to be ground is then separated from the balls and filled. While being ground, the resin becomes electrostatically charged, which at least in part causes the powder to adhere to the light wave guide. One possible grain size distribution of the ground powder ranges between 0.3 and several 100 µm, with a maximum lying between 6 and 50 µm.

EXAMPLE 1

A polyester resin based on terephthalic acid is used as the unsaturated polyester resin for the adhesive. The adhesive has the following composition:

| | |
|---|---|
| Synolite 1835 (terephthalic acid based) Melting point approx. 110° C., viscosity at 165° C. 450–500 mPa.s Manufacturer: DSM | approx. 89.0% |
| Interox TMCH-40-ic (1.1-di(tert.butylperoxide)3.3.5-trimethyl cyclohexane 40% on chalk) Manufacturer: Laporte | approx. 6.0% |
| Aerosil 200 (colloidal silica) Manufacturer: Degussa | approx. 3.5% |
| Bayferrox 720 N red (iron oxide red) Manufacturer: Bayer | approx. 1.5% |

EXAMPLE 2

A mixture consisting of methacrylamide and bisphenol A-dimethacrylate is used as the solid resin for the adhesive. The adhesive has the following composition:

| | |
|---|---|
| Methacrylamide, melting point 110° C. | approx. 80.0% |
| Bisphenol A-dimethacrylate, melting point 70° C. Manufacturer: Röhm | approx. 9.0% |
| Interox TMCH-40-ic (1.1-di(tert.butylperoxide)3.3.5-trimethyl cyclohexane 40% on chalk) Manufacturer: Laporte | approx. 6.0% |
| Aerosil 200 (colloidal silica) Manufacturer: Degussa | approx. 3.5% |
| Bayferrox 720 N red (iron oxide red) Manufacturer: Bayer | approx. 1.5% |

EXAMPLE 3

An epoxy resin is sued as the solid resin for the adhesive. The adhesive has the following composition:

| | |
|---|---|
| Eurepox 7004 (EP-Aq 925) Manufacturer: Witco | 50–70% |

-continued

| | |
|---|---|
| Epoxy adduct (Bekopox 140, 4 ppw) Manufacturer: Hoechst TETA (3 ppw) Manufacturer: Bayer | 20–40% |
| Aerosil 200 (colloidal silica) Manufacturer: Degussa | approx. 5–10% |
| Bayferrox 720 N red (iron oxide red) Manufacturer: Bayer | approx. 1.5% |

Of course, other components and compositions can be selected within the framework of the invention and proceeding from the indicated possible compositions to achieve the desired bond in the procedure according to the invention as reliably and quickly as possible.

The previously described embodiments have all centered on a procedure in which the adhesive is melted and brought to a reactive, liquid state in this way. However, it is also possible within the framework of the invention to bring the adhesive to a liquid state without heating by only adding a solvent. The individual components of the adhesive, which react with each other in a liquid state, then go into solution, after which the adhesive begins to be cured. In this case too, bonding can take place in different ways.

Figure 4:
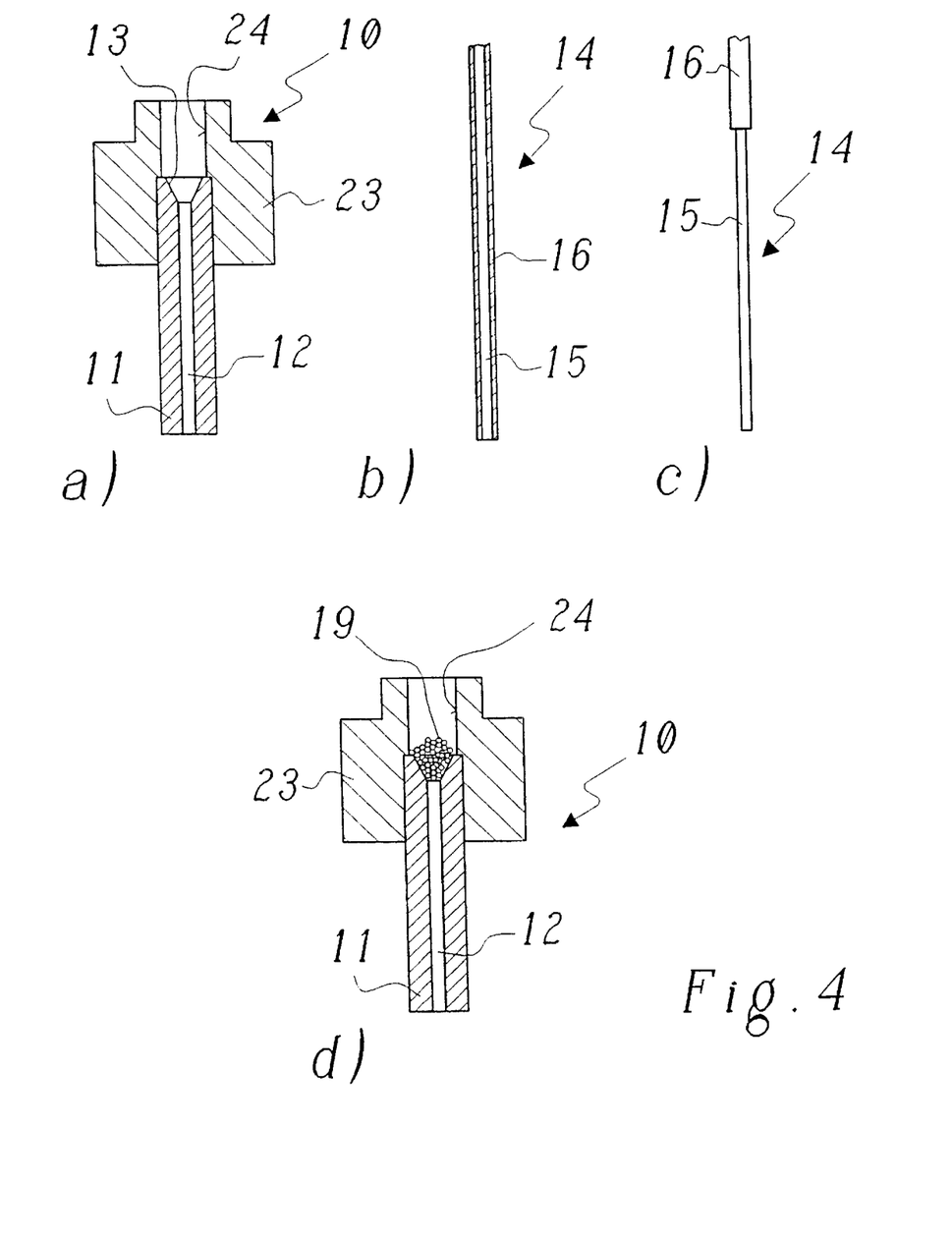

In a first preferred embodiment of this procedural variant, the procedure is the same as depicted for melting in FIGS. 4 to 6: The adhesive is applied to the receptacle 11 in a solid, uncured state in the form of particles 19, in particular filled into the funnel-shaped opening 13 (FIG. 4d). The adhesive (19) applied to the receptacle 11 is then brought to the liquid (dissolved) state by deliberately metering in the solvent, for example toluene or the like (a solution of adhesive forms instead of the melt bath 20 in FIG. 5). The light wave guide 15 is then inserted into the bore hole 12 of the receptacle 11 in the presence of the dissolved adhesive, during which the dissolved, curing adhesive is also introduced into the annular gap 21 between the light wave guide 15 and bore hole 12, and there hardens. The adhesive can here be in powder form, but also exhibit another solid form (e.g., a molding).

Another preferred embodiment of this procedure envisages that a powdery adhesive be used. In this case, the one end of the light wave guide 15 is immersed into the solvent, as depicted in FIGS. 1 to 3. The light wave guide 15 (as shown in FIGS. 1d, e) is then immersed with its one end into the powdery adhesive 18 and withdrawn again from the powdery adhesive 18, during which particles 19 of the powdery adhesive 18 remain stuck on the surface of the light wave guide 15 wetted with the solvent. While the adhering particles 19 on the light wave guide 15 dissolve and the adhesive reacts, the light wave guide 15 is introduced into the bore hole 12 of the receptacle 11 (as in FIGS. 2, 3) and there bonded. In both cases, the same adhesive that was described in detail in conjunction with the melting procedure is used as the suitable adhesive, namely a two-component reaction adhesive that essentially consists of a crystalline resin, to which is added a solid aid for curing purposes, wherein the solid resin is selected from the group of unsaturated polyester resins, solid acrylate resins, methacrylate solid resins and epoxy solid resins, and a peroxide is used as the curing aid for the polyester, acrylate and methacrylate resins, or an amine adduct for the epoxy resins.

All told, the invention results in a bonding procedure for optical plug-in connectors that is simple to use on site, requires little outlay and preparatory work, simplifies stock

LIST OF DESIGNATIONS

| | |
|---|---|
| 10 | Connector |
| 11 | Receptacle |
| 12 | Bore hole |
| 13 | Funnel-shaped opening |
| 14 | Optical cable |
| 15 | Light wave guide |
| 16 | Cover |
| 17 | Container |
| 18 | Adhesive (powdery) |
| 19 | Particles (adhesive) |
| 20 | Melt bath (adhesive) |
| 21 | Annular gap (bore hole light wave guide) |
| 22, 25 | Heater |
| 23 | Mount |
| 24 | Bore hole (mount) |
| 26 | Adhesive (hardened) |

What is claimed is:

1. A procedure for attaching a light wave guide (15) in a connector (10) for an optical plug-in connector, whose connector (10) encompasses a receptacle (11) with a bore hole (12) for receiving the light wave guide (15), wherein the procedure involves inserting the light wave guide (15) into the bore hole (12) of the receptacle (11), and securing it in the bore hole (12) via bonding with an adhesive (18, 19, 26), characterized by the fact that a solid reaction adhesive (18, 19) is used which is made to react via transformation into a liquid state and cured to a temperature-resistant compound, characterized by the fact that a powdery adhesive is used (18), that the light wave guide (15) is immersed in the powdery adhesive (18) with its one end, that the light wave guide (15) is then withdrawn from the powdery adhesive (18) again, with particles (19) of the powdery adhesive (18) remaining stuck to the surface of the light wave guide (15), and that the light wave guide (15) is subsequently introduced into the bore hole (12) of the receptacle (11).

2. Procedure according to claim 1, characterized by the fact that the adhesive (18, 19) is transformed into the liquid state via melting, that the receptacle (11) is brought to and maintained at a temperature greater than or equal to the melting point of the adhesive (14), and that the light wave guide (15) is introduced into the bore hole (22) of the heated receptacle (11) with the adhering particles (19).

3. Procedure according to claim 1, characterized by the fact that the adhesive (18, 19) is transformed into a liquid state by adding a solvent, that the light wave guide (15) is first immersed into the solvent with its one end, and that the light wave guide (15) is subsequently immersed in the powdery adhesive (18) with its one end.

4. Procedure according to claim 1, characterized by the fact that a receptacle (11) with a bore hole (12) is used whose inside diameter is only slightly, preferably about 0.002 to 0.008 mm, larger than the outside diameter of the light wave guide (15).

5. Procedure according to claim 1, characterized by the fact that a receptacle (11) consisting of precision ceramics is used.

6. Procedure according to claim 1, characterized by the fact that opening (13) of bore hole (12) is shaped like a funnel.

7. Procedure according to claim 1, characterized by the fact that use is made of a light wave guide (15) that exhibits a cover (16), that the cover (16) is removed to a sufficient length prior to bonding, and that the uncovered light wave guide (15) is cleaned after removing the cover (16) and before bonding.

8. Procedure according to claim 7, characterized by the fact that cleaning takes place mechanically, preferably via wiping off with a fleece.

9. Procedure according to claim 1, characterized by the fact that the used adhesive (18) exhibits a viscosity of less than or equal to 500 mPa.s in the melted state.

10. Procedure according to claim 1, characterized by the fact that the used adhesive (18) exhibits a short reaction time, preferably between 10 and 20 seconds, in particular about 15 seconds.

11. Adhesive for the procedure according to claim 1, characterized by the fact that the adhesive (18) is a two-component reaction adhesive, and that the adhesive (18) essentially consists of a solid, preferably crystalline resin, to which a solid aid is added for curing purposes.

12. Adhesive according to claim 11, characterized by the fact that the solid resin is selected from the group of unsaturated polyester resins, the solid acrylate resins, the methacrylate solid resins and epoxy solid resins, and that a peroxide, e.g., an amine adduct for the epoxy resins, is used as the curing aid for the polyester, acrylate and methacrylate resins.

13. Adhesive according to claim 12, characterized by the fact that a (1.1-di(tert.butylperoxide) 3.3.5-trimethylcyclohexane 40% on chalk) is used as the peroxide.

14. Adhesive according to claim 12, characterized by the fact that the adhesive (18) is present in powder form, and that a separating agent is added to the powdery adhesive (18), preferably in the form of a colloidal silica.

15. Adhesive according to claim 14, characterized by the fact that a pigment, preferably a red iron oxide, is mixed in with the powdery adhesive (18) for improved monitoring of the bonding procedure.

16. Adhesive according to claim 12, characterized by the fact that a polyester resin based on terephthalic acid is used as the unsaturated polyester resin.

17. Adhesive according to claim 16, characterized by the fact that it consists of approx. 89% polyester resin, approx. 6% 1.1-di(tert.butylperoxide)3.3.5-trimethylcyclohexane 40% on chalk, approx. 3.5% colloidal silica and approx. 1.5% iron oxide.

18. Adhesive according to claim 12, characterized by the fact that a mixture of methacrylamide and bisphenol A-dimethacrylate is used as the solid resin.

19. Adhesive according to claim 18, characterized by the fact that it consists of approx. 80% methacrylate, approx. 9% bisphenol A-dimethacrylate, 6% 1.1-di(tert.butylperoxide) 3.3.5-trimethylcyclohexane 40% on chalk, approx. 3.5% colloidal silica and approx. 1.5% iron oxide.

20. Adhesive according to claim 12, characterized by the fact that an epoxy resin is used as the solid resin.

21. Adhesive according to claim 20, characterized by the fact that it consists of 50–70% epoxy resin, 20–40% epoxy adduct, 5–10% colloidal silica and approx. 1.5% iron oxide.

* * * * *